United States Patent [19]
Nötzold

[11] Patent Number: 5,628,127
[45] Date of Patent: May 13, 1997

[54] WATERPROOF SHOE

[75] Inventor: Günter Nötzold, Landshut, Germany

[73] Assignee: W. L. Gore & Associates, Inc., Newark, Del.

[21] Appl. No.: 422,195

[22] Filed: Apr. 11, 1995

[30]  Foreign Application Priority Data

Apr. 25, 1994 [DE] Germany ................ 9406905 U

[51] Int. Cl.⁶ ............................................. A43B 13/28
[52] U.S. Cl. ........................................ 36/14; 36/55
[58] Field of Search ............................ 36/14, 4, 10, 12, 36/98, 55

[56]  References Cited

U.S. PATENT DOCUMENTS

| | | | |
|---|---|---|---|
| 2,437,030 | 3/1948 | Hoza | 36/14 |
| 2,694,871 | 11/1954 | Rollman | 36/14 |
| 3,953,566 | 4/1976 | Gore . | |
| 4,187,390 | 2/1980 | Gore . | |
| 4,194,041 | 3/1980 | Gore et al. . | |
| 4,493,870 | 1/1985 | Vrouenraets et al. . | |
| 4,725,481 | 2/1988 | Ostapchenko . | |
| 4,899,465 | 2/1990 | Bleimhofer et al. | 36/14 |
| 5,285,546 | 2/1994 | Haimerl | 36/14 |
| 5,505,011 | 4/1996 | Bleimhofer | 36/4 |

FOREIGN PATENT DOCUMENTS

| | | | |
|---|---|---|---|
| 0298360 | 10/1994 | European Pat. Off. . | |
| 1398283 | 3/1965 | France | 36/14 |
| 2567195 | 1/1986 | France . | |
| 4138836 | 5/1993 | Germany . | |
| 744149 | 2/1956 | United Kingdom | 36/14 |

*Primary Examiner*—Ted Kavanaugh
*Attorney, Agent, or Firm*—Gary A. Samuels

[57]  ABSTRACT

The invention is a waterproof shoe which is characterized in that the lower edge of the upper material and the lower edge of the functional material layer are cut to different lengths so that one of the two edges projects over the other edge, and characterized in that at least the area of the insole adjacent to the seam consists of a material which is permeable to the plastic material used for the outsole in its liquid injection state, and the lower edge of the functional material layer is embedded into the plastic material used for the outsole.

7 Claims, 3 Drawing Sheets

WATERPROOF SHOE

FIELD OF THE INVENTION

The invention relates to a waterproof shoe and more particularly to such a shoe having an upper, an insole and a sole.

BACKGROUND OF THE INVENTION

It is known to provide a waterproof shoe with a water permeable and water vapor permeable upper portion, an insole which is sewn to the upper portion thus providing a seam, and an inner functional material layer which is arranged on the inside of the upper portion which is a laminate of a waterproof, water vapor permeable layer and a textile layer at least on one side of the permeable layer, wherein the insole, the lower edge of the upper portion facing the insole and the lower edge of the functional material layer facing the insole are located within an injection molded plastic sole.

The advantage of a shoe of such a construction is that it is not only waterproof but also breathable, i.e. passes water vapor. If the shoe is exposed to water from outside, the water cannot reach the foot. On the other hand, in contrast to waterproof shoes with a waterproof and water-vapor impermeable outer material, e.g. rubber boots, foot perspiration can escape through the water and water vapor permeable upper material.

Seams through the functional material layer portions create difficulties with respect to waterproofness. To overcome these difficulties, some prior art methods use sock-like functional layer inserts between the foot and the outsole or insole on the one hand and the inner lining of the shoe on the other hand. Since the desired shape can be imparted to such a sock-like insert by heat sealing, it does not contain any seam holes. This method, however, is very expensive to manufacture since the sock-like inserts must be adapted to the shoe shape.

A shoe designed as described above is disclosed in EP 02 98 360 B1. In this case the insole edge, the lower edge of the functional material layer and the lower edge of the upper material are sewn together by a single seam. To prevent water from creeping down the upper up to this connection seam and along the connection seam through the seam holes in the functional material layer to the inside of the shoe, the lower area of the upper material in this shoe consists of a mesh band which is not water conductive. The lower edge of the mesh band is sewn to the insole and the lower edge of the functional material layer by the already mentioned seam. The upper edge of the mesh band is sewn only to the remaining part of the upper material, but not to the functional material layer. Water creeping down the upper material can thus not reach the seam going through the edge of the functional material layer.

This design overcomes another problem. The functional material layer is a laminate that incorporates a textile layer, at least on its inside facing away from the upper material, generally in the form of a textile lining. When the functional material layer laminate is cut to size, it is virtually inevitable that little textile threads are laid bare around the cut edge of the functional material towards its outside. These textile threads act as water bridges when water reaches the cut edge on the outside of the functional material layer. Through the use of the monofilic mesh band, however, water cannot reach the cut edge of the functional material layer so that the water bridge function of such threads cannot have any effect. This method results in a very high reliability of the waterproofness of such waterproof, breathable shoes which are not equipped with a closed, sock-like functional layer insert. The mesh band, however, presents difficulty in handling, in particular in small shoes, such as children's shoes, if wrinkles in the mesh are to be avoided, in particular at areas where the shoe contours are very curved. These difficulties are eased by a shoe as described in DE 41 38 836 A1. In this shoe, as in the shoe known from EP 02 98 360 B1, the upper material edge is cut slightly shorter than the functional material edge, but the gap between the upper material edge and the functional material edge is not closed by a meshband but left completely open, i.e. it is only the lower edge of the functional material layer that is sewn to the insole edge. The lower edge of the upper material ends at a certain distance from the lower edge of the functional material layer. The lower edge of the upper material is glued to the functional material layer to prevent through holes of a seam from piercing the functional material. The gap between the upper material edge and the insole seam is closed by the injection molded outsole.

This approach, too, results in highly reliable waterproofness of breathable shoes. However, quite a high degree of dexterity is required to produce such a shoe.

Since in both state of the art approaches the lower edge of the upper material of the upper material itself ends somewhat above the insole seam, the injection molded outsole must have a relatively high lateral wall to prevent the lower edge of the upper material leg edge or the mesh band from lying open.

SUMMARY OF THE INVENTION

The object of the present invention is to provide a waterproof shoe which is easier to produce than the above-mentioned shoes and which additionally can be produced with an injection molded outsole of a lower lateral wall height.

The present invention consists of a waterproof shoe of the general type described above which is characterized in that the lower edge of the upper material and the lower edge of the functional material are cut to different lengths so that one of the two edges projects over the other edge, such that the lower edge of the functional material layer is not part of the seam, and characterized in that at least the area of the insole adjacent to the seam is a material which is permeable to the plastic material used for the outsole in its liquid injection state, and the lower edge of the functional material layer is embedded into the plastic material used for the outsole.

The term "plastic" is preferably an injectable natural or artificial rubber latex.

DETAILED DESCRIPTION OF THE INVENTION

Figure 1:
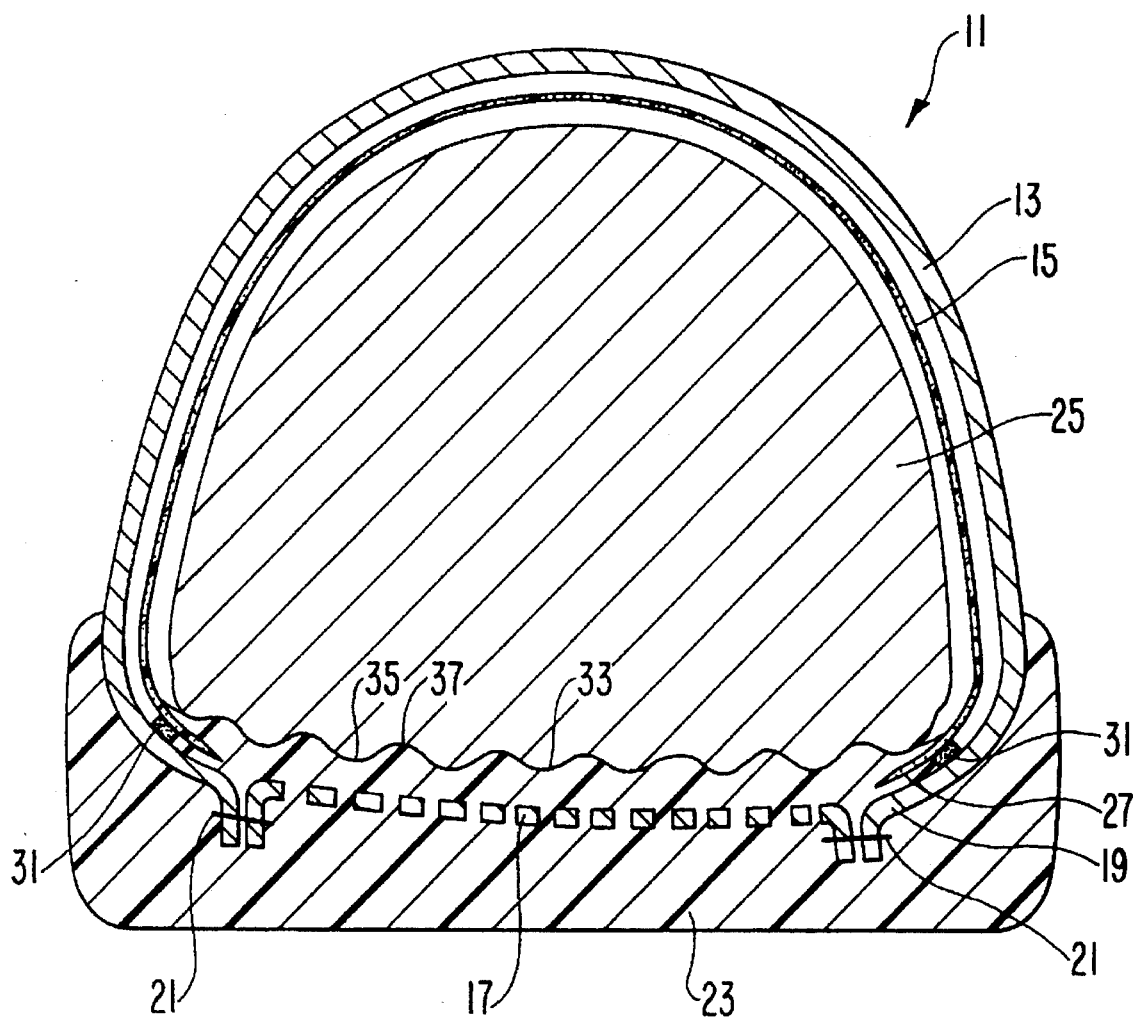
FIG. 1 is a cutaway view of a first embodiment of a shoe of the invention on a last.
Figure 2:
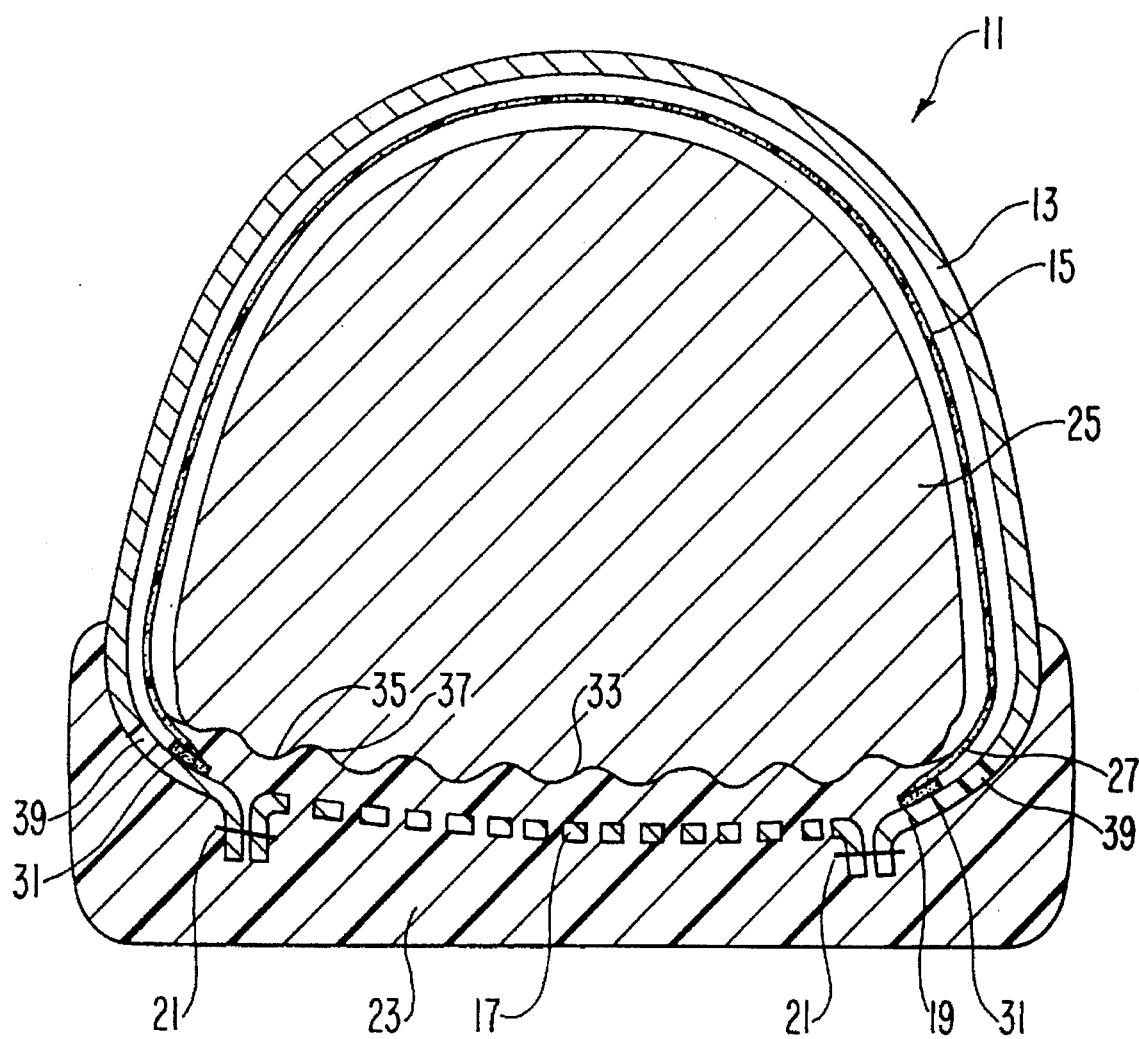
FIG. 2 is a cutaway view of a second embodiment of a shoe of the invention on a last.
Figure 3:
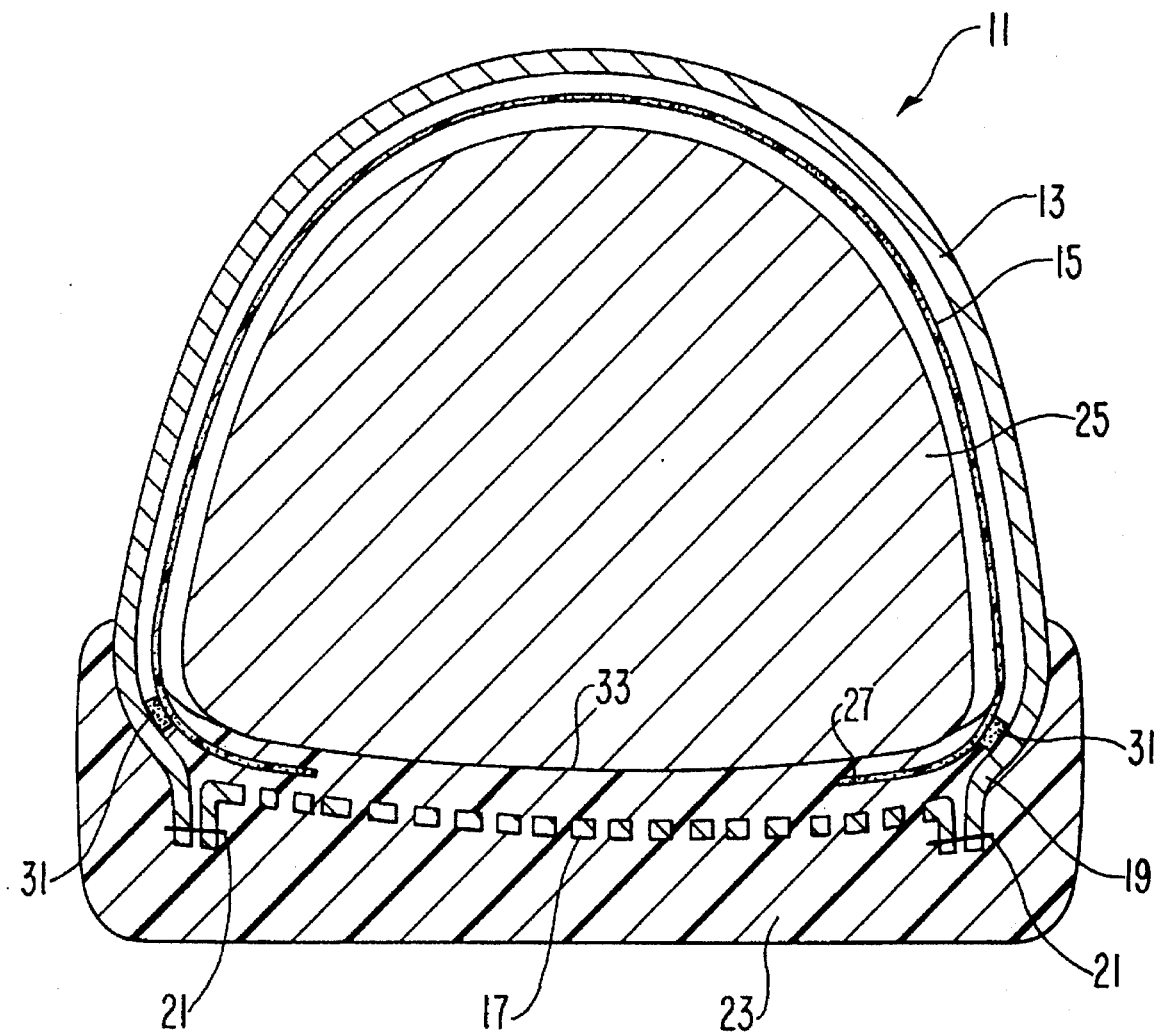
FIG. 3 is a cutaway view of a third embodiment of a shoe of the invention on a last.

Referring to the figures, FIGS. 1 and 2 show embodiments of a shoe of the invention in which the lower edge 27 of functional material layer 15 is cut shorter than the lower edge 19 of upper material 13. FIG. 3 shows an embodiment in which the lower edge 27 of functional material layer 15 is cut longer than the lower edge 19 of upper material 13. In the figures, characteristics which are common to all the figures have been identified with the same reference numerals.

FIG. 1 shows one embodiment comprising a waterproof, breathable shoe 11 with an upper material 13, a functional material layer 15 located on the inside of the upper material 13, a perforated insole 17 which is sewn to a lower edge 19 of upper material 13 by a seam 21 and an outsole 23 in the form of an injection molded plastic sole. A last 25 which is used for producing the shoe is located within the shoe. The upper material is water permeable and water vapor permeable.

In the variant shown in FIG. 1, the lower edge 27 of the functional material layer 15 is cut shorter than the lower edge 19 of upper material 13. A preferred projecting dimension of the lower edge 19 of the upper material layer 13 over the lower edge 27 of functional material layer 15 ranges from 5 mm to 7 mm. In order to facilitate manufacturing, it is preferable to attach the outside of the lower edge 27 of the functional material 15 layer by adhesive 31 on the inside of the lower portion of upper material edge 19. The adhesive is located at a predetermined distance from the cut edge of the lower functional layer edge 27 so that the outsole plastic can embed the lower edge of the functional material layer. The loose end area of the lower functional material layer edge 27 may be surrounded by liquid outsole plastic from all sides while the outsole is injection molded. The functional layer 15 consists of a laminate with a waterproof, water-vapor permeable layer on whose outside facing upper material 13 there can be a textile reinforcing material and on whose inside facing the last 25 there may be a textile lining layer.

It is important that the lower functional material layer edge 27 is not connected in any way with the seam 21 between the insole 17 and the lower part 19 of the upper material. On the contrary, the free lower end of the lower functional layer edge 27 is located loosely between the last 25 and the lower edge of the upper material 19 before the injection process. To facilitate handling during shoe production, the lower functional layer edge 27 is held stationary at a predefined distance from the end 27 of the lower functional layer edge by means of an adhesive 31, which can be a tape.

The bottom 33 of last 25 preferably has a wave shape to provide for wave crests 35 between wave troughs 37, seen from the middle of the last, and to keep large parts of the insole 17 at a minimum distance from the last bottom 33 by means of the wave crests 35 during the injection process of the outsole. A wave trough should be located in the area of the free end of the lower edge 27 of the functional layer to ensure a good flow all around the lower functional layer edge 27.

The free end of the lower portion of functional layer edge 27 is shown bevelled on its inside. This schematically shows that this end is pared, i.e. the textile lining layer on the inside of the functional layer is skived off by an inclined cut to allow the outsole material, which is liquid during the injection process, to penetrate up to the inside surface of the functional layer there because the lining textile of the functional layer laminate is usually not penetrated up to the functional layer.

The seam 21 may be in the form of a Strobel-type seam or a spanned seam. The design as a spanned seam is preferred because the areas of the insole 17 and the lower edge 19 of the upper material adjacent to the spanned seam are pulled away from the last bottom 33, leaving particularly ample space for the injection of liquid outsole material in this area and allowing a particularly effective rinsing of outside, inside and cut edge of the lower functional layer edge 27 by the outsole material so that these areas are well sealed.

The embodiment shown in FIG. 2 corresponds to the one shown in FIG. 1, the only exception being that the adhesive 31 is not located at a distance from the free end of the lower functional material layer edge 27 but in direct vicinity to this free end. In this case it is possible to use adhesive 31 not only to attach the lower ends of the upper material edge 19 and the functional layer edge but also to create the sealing effect of the outsole material on the outside of the lower functional layer edge 27. In this case the adhesive, preferably a tape, is preferably made from the same material as the outsole, e.g. polyurethane, in the form frequently used for injection molded outsoles.

It is in particular when the adhesive tape 31 in this embodiment consists of glue of insufficient sealing power that the lower edge of upper material 13 may be provided with a perforation 39 in the area between the adhesive tape 31 and the upper edge of the lateral wall of the outsole. The outsole plastic can thus seal the outside of the functional layer laminate in the area above the adhesive tape 31. Such a perforation 39 can, however, be advantageous in all variants described.

However, in this instance where the adhesive is positioned directly at the cut end of the lower edge of the functional layer, the lower functional layer edge would be held stationary up to the cut edge for the injection process. In this case the same plastic material may be used as the adhesive as is used for the outsole so that after outsole injection molding the lower edge of the functional layer is embedded in outsole plastic.

For this variant, also, it is also possible to use a plastic material as adhesive which is different from the outsole plastic material. For example this might be an adhesive which behaves similarly as the outsole plastic and which seals the outside of the lower edge of the functional layer basically in the same way as the outsole plastic. If an adhesive is used in this second variant which does not have the same sealing effect as the outsole plastic, the lower part of the upper material can be perforated above the adhesive so that the outside of the functional layer laminate is adhesively bonded and sealed with outsole plastic there.

The embodiment shown in FIG. 3 largely corresponds to those shown in FIGS. 1 and 2, the exceptions being that the lower functional layer edge 27 is cut longer than the lower upper material edge 19 and that a last 25 with a level last bottom 33 is used. If, according to FIG. 3, the lower functional material layer edge 27 is made longer than the lower edge 19 of the upper material 13, the free end of the lower functional layer edge 27 lies so far under the underside of the last bottom 33 that an adhesive attachment is not absolutely necessary between the lower functional layer edge 27 and the lower upper material leg edge 19 as shown in FIG. 3. In this case, the lower functional layer edge 27 lies loosely between the last bottom 33 and the perforated insole 17 while the liquid plastic is injected to form the outsole 23.

In this embodiment, too, it is advantageous to use a span seam as a seam 21 to span the insole 17 and the lower upper material edge 19 as far as possible away from the last bottom 33 in the area of this seam and to ensure an effective flow of liquid outsole material around the inside, the outside and the cut surface of the lower functional layer edge 27. In this embodiment, too, a last 25 of uneven, e.g. wavy, shape could be used.

In this variant, a preferred projecting dimension over the lower edge of the upper material ranges from 5 mm to 7 mm. Therefore the lower end of the lower edge of the functional layer lies over an edge area of the insole loosely relative to the insole and the upper material until the outsole has been connected by injection molding.

When the outsole is connected by injection molding in this variant, too, the area of the lower functional layer edge is surrounded by outsole plastic on its outside, inside and cut surface and sealed all around. In this variant, too, the functional material layer and the upper material can be held at a distance from each other in that an adhesive can be applied in the lower areas of the funcitonal material layer and the upper material to facilitate handling during shoe production. For example, such an adhesive can be applied at a distance of about 5 mm from the lower end of the upper material.

If it is desired to seal the outside of the functional layer laminate in the area of the lower edge of the functional layer over a large surface with outsole plastic, the lower edge of the upper material can be perforated in an area adjacent to the insole seam and covered by the lateral wall of the outsole in all the above variants.

The insole can be made permeable to the outsole plastic to be applied in the liquid state during the injection molding process e.g. by perforating the insole.

In the waterproof shoe of the invention the outsole plastic material, which is liquid during the injection process permeates the insole, which is permeable to the liquid plastic in this state, while the shoe is located on a last. The outsole plastic is flowed around the end of the lower edge of the functional layer so that this lower edge is embedded into outsole plastic. It is important that the outsole plastic is located on the outside of the functional material layer facing the upper face material and is located in the area of its cut edge. Since the cut edge is embedded in the outsole plastic, any textile threads which might act as water bridges and which extend around the cut edge are rendered harmless. It is very important that outsole plastic reaches the outside of the functional material layer because the outside of the functional layer lies exposed or is covered only be a textile reinforcement layer through which the liquid outsole plastic can reach the functional material layer. During the injection molding process of the outsole therefore the outside of the functional layer is sealed by the outsole plastic, no matter whether it is provided with a reinforcing textile layer or not. Water creeping along the upper material downwards to the insole seam now can then no longer migrate along the outside of the functional layer up to its cut edge and via water bridges in the form of small textile threads to the inside of the functional layer laminate and is thus kept away from the shoe wearers foot.

In a preferred embodiment, an insole is made from a material which is permeable to liquid outsole plastic due to the way it was produced. Examples are mesh materials, woven and knitted textiles and in particular non-woven materials. The insole preferably consists of a material which does not absorb the outsole plastic which is liquid during the injection process.

The insole seam may be a Strobel-type seam. It is particularly advantageous to design the insole seam as a spanning seam, i.e. a seam which spans the insole edge and the lower edge of the upper material away from the shoe last so that the liquid outsole material can reach the lower edge of the functional material layer particularly easily and can flow around it.

In a preferred embodiment, the insole seam is staggered inwards relative to the outer contours of the upper material by a predefined degree towards the center of the insole. In this case the lateral wall height of the outsole can be even further reduced.

In order to obtain a particularly effective flow around the lower functional layer edge preferably a last is used to produce a shoe of the invention, the last bottom being provided with dot-shaped or other, e.g. wave shaped prominences. This ensures a distance between the last bottom and the insole which is permeable to the liquid outsole plastic, which increases the effectiveness of the flow of liquid outsole plastic around the lower edge of the functional layer.

The state of the art already provides for injection through a perforated insole when injection molding an outsole of liquid outsole plastic in FR-A-2 567 195. In this case an intermediate sole is located on the side of the insole facing away from the outsole and is equipped with anchoring openings into which the liquid outsole plastic is to run during the injection process so that the outsole is anchored in this intermediate sole.

Materials suitable for the waterproof, water vapor permeable component of functional layer 15 include microporous expanded polytetrafluoroethylene (PTFE) as described in U.S. Pat. Nos. 3,953,566 and 4,187,390; expanded PTFE provided with hydrophilic impregnating agents and/or layers as described in U.S. Pat. No. 4,194,041; breathable polyurethane layers; or elastomers such as copolyetherester and laminates thereof as described in U.S. Pat. Nos. 4,725,481 and 4,493,870.

I claim:

1. A waterproof shoe comprising a water permeable and water vapor permeable upper material having an inside and a lower edge, an insole sewn to the upper material thus providing a seam and a functional material layer having a lower edge, the functional material layer being arranged on the inside of the upper material and which comprises a waterproof, water vapor permeable layer wherein the insole, the lower edge of the upper material facing the insole, and the lower edge of the functional material layer facing the insole are located on the inside of an injection molded plastic outsole, wherein the lower edge of the upper material and the lower edge of the functional material layer are cut to unequal lengths such that one of these two edges projects over the other edge without any participation of the lower edge of the functional material layer in the seam; and wherein the insole, at least in its area adjacent to the seam, comprises a material which is permeable to the outsole plastic in its liquid state during the injection process of the outsole, and wherein the lower edge of the functional material layer is embedded in the outsole plastic.

2. A shoe of claim 1, characterized in that the insole is selected from the group consisting of a mesh material, a woven textile material, a knitted textile material, and a non-woven material.

3. A shoe of claim 2, characterized in that the insole is a material which is not absorptive for the outsole plastic in the liquid state.

4. A shoe of claim 1, characterized in that the functional material layer is attached by adhesive in the area of its lower edge to the upper material.

5. A shoe of claim 1, characterized in that the waterproof, water vapor permeable layer of the functional material is microporous polytetrafluoroethylene (PTFE).

6. A shoe of claim 1 wherein the lower edge of the functional material layer is cut shorter than the lower edge of the upper material.

7. A shoe of claim 1 wherein the lower edge of the upper material is cut shorter than the lower edge of the functional material layer.

* * * * *